United States Patent
Porter

(10) Patent No.: US 12,111,648 B2
(45) Date of Patent: Oct. 8, 2024

(54) DETECTING BLOCKAGES IN AGRICULTURAL EQUIPMENT USING VIBRATION SENSORS

(71) Applicant: Trimble Inc., Sunnyvale, CA (US)

(72) Inventor: Miles R. Porter, Minneapolis, MN (US)

(73) Assignee: Trimble Inc., Sunnyvale, CA (US)

(*) Notice: Subject to any disclaimer, the term of this patent is extended or adjusted under 35 U.S.C. 154(b) by 118 days.

(21) Appl. No.: 17/882,126

(22) Filed: Aug. 5, 2022

(65) Prior Publication Data

US 2024/0045413 A1     Feb. 8, 2024

(51) Int. Cl.
*G05B 23/00* (2006.01)
*A01C 7/10* (2006.01)
*G05B 23/02* (2006.01)

(52) U.S. Cl.
CPC ............ *G05B 23/024* (2013.01); *A01C 7/105* (2013.01); *G05B 23/0221* (2013.01)

(58) Field of Classification Search
CPC .. G05B 23/0221; G05B 23/024; A01C 7/105; G01H 1/00
See application file for complete search history.

(56) References Cited

U.S. PATENT DOCUMENTS

| | | | | |
|---|---|---|---|---|
| 5,847,389 | A * | 12/1998 | Mertins | A01C 7/105 250/222.2 |
| 6,093,926 | A * | 7/2000 | Mertins | G01V 8/12 377/6 |

(Continued)

FOREIGN PATENT DOCUMENTS

| | | | | |
|---|---|---|---|---|
| CA | 2291598 C | * | 2/2007 | ............ A01C 7/081 |
| CA | 2806410 A1 | * | 2/2014 | ............ A01C 7/081 |

(Continued)

OTHER PUBLICATIONS

Guzma et al., Instruction buffer with limited control flow and loop nest support, Jul. 2011, 2011 International Conference on Embedded Computer Systems: Architectures, Modeling, and Simulation, Samos XI, Samos, Greece, pp. 1-7. DOI: 10.1109/SAMOS.2011. 6045470 (Year: 2011).*

(Continued)

*Primary Examiner* — Mi'schita' Henson
(74) *Attorney, Agent, or Firm* — Kilpatrick Townsend & Stockton LLP

(57) ABSTRACT

A sampling device receives, from each a plurality of transducer computing devices, respective vibration input samples. The sampling device generates a loop buffer corresponding to a most recent threshold number of samples received from each of the plurality of transducer computing devices including first and second transducer devices each located within a predefined proximity to first and second flow tubes of an equipment. The sampling device accesses, from the loop buffer, a most recent first sample logged by the first transducer computing device. The sampling device assigns, using a trained model, the first input sample to a first category of a set of categories. The sampling device accesses, from the loop buffer subsequent to accessing the first sample, a most recent second sample logged by a second transducer computing device and, using the model, assigns the second input sample to a second category of the set of categories.

17 Claims, 5 Drawing Sheets

(56) References Cited

U.S. PATENT DOCUMENTS

| | | | | |
|---|---|---|---|---|
| 9,324,197 | B2* | 4/2016 | Gelinske | ............... A01C 7/081 |
| 2014/0191857 | A1* | 7/2014 | Sauder | .................. A01C 7/205 |
| | | | | 340/431 |
| 2019/0323873 | A1* | 10/2019 | Bitto | ........................ G01F 1/74 |

FOREIGN PATENT DOCUMENTS

| | | | |
|---|---|---|---|
| CA | 3 059 457 A1 | 4/2020 | |
| CN | 107409547 A | 12/2017 | |
| WO | WO-2014197973 A1 * | 12/2014 | ............ A01C 7/082 |
| WO | WO-2020240301 A1 * | 12/2020 | ............ A01C 7/105 |
| WO | WO-2021183027 A1 * | 9/2021 | ............ A01C 15/04 |
| WO | 2022/072921 A1 | 4/2022 | |

OTHER PUBLICATIONS

Extended European Search Report for Application No. 23188090.7-1001, date of completion of the search Jan. 10, 2024, 9 pages.

* cited by examiner

DETECTING BLOCKAGES IN AGRICULTURAL EQUIPMENT USING VIBRATION SENSORS

TECHNICAL FIELD

This disclosure generally relates to classifying input data indicating environmental conditions. More specifically, but not by way of limitation, this disclosure relates to using machine learning models to classify input data and detect input data indicating anomalous operating conditions of agricultural equipment.

BACKGROUND

To ensure efficient use and operation of equipment (e.g., agricultural equipment such as a planter device which spreads seed in a field via a plurality of seed flow tubes) in various operating environments, it is important to monitor the operating state or condition of the equipment. In some instances, operators or control systems may perform actions (e.g., rerouting, disabling, or otherwise altering an operating state of the equipment) to unblock and/or avoid blockage to the equipment.

In conventional planter equipment, seed may flow through a plurality of flow tubes and, in some instances, if a flow tube becomes blocked, the associated seed is prevented from being released via the equipment. Conventional methods for monitoring a flow of seed through a flow tube include placing a piezoelectric sensor in the flow tube so that seed flowing through the flow tube contacts (e.g., bounces off) the piezoelectric sensor, enabling the sensor to count the seed. However, these conventional methods for monitoring seed flow through agricultural equipment are disadvantageous because not all seeds may bounce off the sensor. Secondly, taking into consideration the magnitude of seed impact, and the overall impacts of multiple seeds over time presents the opportunity to better determine the kind of seed being planted.

Further, conventional supervised clustering models and anomaly detection models are either not configured to be retrained or have long retraining periods and are, thus, often unable to provide accurate predictions (1) when redeployed from one environment to another and (2) in dynamic environments that experience evolving environmental conditions, resulting in hyper-classification of environmental data as anomalous. Further, the necessary retraining periods of certain conventional supervised clustering and anomaly detection models may be longer than a time period of a desired application of the model and therefore these conventional models may be unsuitable for training on the fly in applications of short duration and/or may not, due to greater consumption of computing resources, be economically effective in applications of short duration.

Further, conventional methods for monitoring seed flow simultaneously monitor a plurality of flow tubes. Conventional methods for monitoring seed flow through agricultural equipment are disadvantageous because they result in the extra cost involved with dedicated processing units for each seed flow tube, and a necessary mechanism for coalescing information from each individual processor.

SUMMARY

Certain embodiments involve detecting anomalies in vibration samples in an operating environment of an equipment, according to certain embodiments described in the present disclosure. A sampling computing device receives, from each a plurality of transducer computing devices, respective vibration input samples. The sampling computing device generates a loop buffer corresponding to a most recent threshold number of vibration input samples received from each of the plurality of transducer computing devices including a first transducer device located within a predefined proximity to a first flow tube of an equipment and a second transducer device located within the predefined proximity to a second flow tube of the equipment. The sampling computing device accesses, from the loop buffer, a most recent first vibration sample logged by the first transducer computing device. The sampling computing device assigns, using a trained model, the first vibration input sample to a first category of a set of categories for which the trained model is trained, each category of the set of categories specifying an operating condition of flow tubes of the equipment. The sampling computing device accesses, from the loop buffer subsequent to accessing the first vibration sample, a most recent second vibration sample logged by a second transducer computing device. The sampling computing device using the model, assign the second vibration input sample to a second category of the set of categories.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
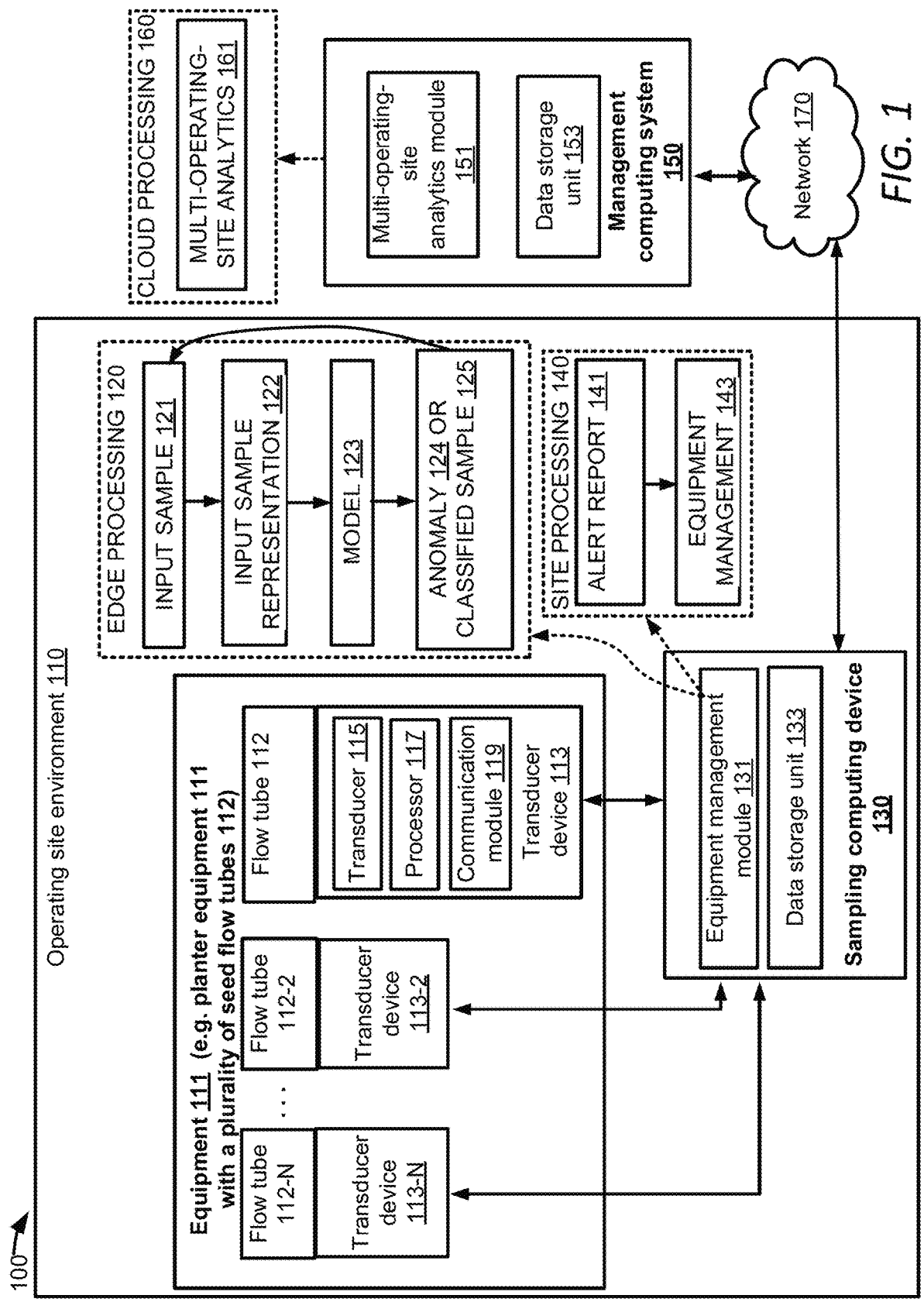
FIG. 1 depicts an example of a computing environment for detecting anomalous vibration samples in a flow tube environment of an equipment, according to certain embodiments described in the present disclosure.

The present disclosure involves detecting anomalous vibration samples in a flow tube environment of an equipment. For instance, as explained above, conventional systems designed for detecting anomalous conditions do not employ periodic retraining of anomaly detection models. Therefore, conventional anomaly detection systems are not able to perform well in environments with changing environmental conditions, thereby increasing a likelihood of misidentification of input data as being anomalous. Certain embodiments described herein can avoid one or more of these problems by, for example, periodically retraining an anomaly detection model. The periodic retraining, using short retraining periods (e.g., a few seconds) that use less computational resources, of the machine learning anomaly detection models described in certain embodiments herein allows for adaptability to a dynamic environment and for effective use in applications of short duration, which is either not possible or not cost effective using conventional machine learning models.

For instance, as explained above, conventional systems designed for detecting anomalous conditions do not employ sampling the overall vibration and acoustic properties detected by the sensor over a discrete sampling period. Therefore, conventional anomaly detection systems are not able to perform well because these conventional systems detect specific instances of seed hitting a sensor, thereby increasing a likelihood that individual seeds may miss the sensor altogether. Certain embodiments described herein can avoid one or more of these problems by, for example, if a sample of the acoustic/vibration properties of the flow tube are captured of a discrete interval of time, then the aggregated nature of this data is not subject to missing individual seed hits on the sensor. The continuous sampling and summarization of discrete time slices described in certain embodiments herein allows for a more generalized data sample which requires less use of computational resources and is more resilient to individual missing seed impacts.

For instance, as explained above, conventional systems designed for detecting anomalous conditions do not employ more generalized sampling based on discrete time intervals. Therefore, conventional anomaly detection systems are not able to perform well because individual missed seed impacts could be interpreted as the beginning of a flow blockage, thereby increasing a likelihood of a false positive when detecting a seed flow blockage event. Certain embodiments described herein can avoid one or more of these problems by, for example, using continuous sampling and summarization of time slices. The sampling mechanism described in certain embodiments herein allows for aggregated sampling and at a lower sampling frequency with less use of computational resources.

The following non-limiting example is provided to introduce certain embodiments. A sampling device detects initial vibration samples from a flow tube environment via a transducer that is placed on or near a flow tube of an equipment (e.g., a seed flow tube of a planter equipment). In some embodiments, during operation, the equipment produces physical vibrations in the environment (e.g., seed flows through the flow tube, generating vibrations) that the transducer detects and communicates the detected physical vibrations detected in the flow tube environment to the sampling device. The transducer converts physical vibrations from the flow tube environment into electrical signals and the sampling device, in some embodiments, generates the vibration samples by converting the electrical signals outputted via the transducer to a digital signal format, rendering the digital signal format into a one-dimensional array (also known as a time series or waveform), and then converting the one-dimensional array data into two-dimensional spectrogram data. In other embodiments, statistical analysis is performed on the one-dimensional array including but not limited to the average (mean) amplitude of the sampled values, the standard deviation of the sampled values, the mean amplitude of specific frequencies in the one-dimensional array, and the standard deviation of the amplitudes of specific frequencies present in the one-dimensional array. In some embodiments, the sampling device detects vibration samples periodically using the transducer. For example, at every predefined frequency (e.g., at every one second), the sampling device detects, via the transducer, a new vibration sample of a predefined amount of time (e.g., a one second vibration sample). In some embodiments, the sampling device continuously detects vibration samples, enabling the processing mechanism to retrieve a given duration of samples (e.g., one second worth of vibration information) from any given offset from the beginning of the recorded continuous sample.

In some embodiments, the sampling device performs a principal component analysis on the set of the predefined amount of vibration samples to reduce the vibration samples to principal components or dimensions. In some embodiments, summary statistics such as the mean and standard deviation of the sampled signal amplitude and the mean and standard deviation of the sample amplitude along discrete frequencies can be used as the basis for classification and anomaly detection. In some embodiments, the sampling device performs the principal component analysis on training data including the two-dimensional spectrogram data representing the set of vibration samples. In some embodiments, summary statistics like standard deviation of either the entire sample waveform or along discrete frequencies present in the sample waveform can augment the principal components detected in the sample data. The sampling device may train an anomaly detection model on the set of samples. In some embodiments, the sampling computing device trains a one class support vector machine ("OCSVM") to detect anomalous vibration samples. The sampling computing device trains the OCSVM using the principal component analysis data and/or the sample data descriptive statistics determined from the set of initial vibration samples or using data that is determined by reducing a number of dimensions in the principal component analysis data. In some embodiments, the sampling device trains the OCSVM to predict if subsequent vibration samples are anomalous. In the embodiments described herein, the identified clusters may or may not have ground truth labels and the OCSVM can determine if a vibration sample is anomalous (corresponds to a known cluster) whether or not the known clusters have ground truth labels.

The sampling device may collect a next vibration sample from the operating site environment. In some embodiments, the sampling device may retrieve a previous interval (e.g., one second) worth of sampled data stored in a sample buffer. In some examples, the sampling device continues to collect vibration samples at a predefined rate (e.g., a one second vibration sample collected every one second) after (1) collecting the set of initial vibration samples, (2) training the anomaly detection (OVSCM) model. For example, the sampling device, for the set of initial vibration samples, collected 30 subsequent one-second (1 s) vibration samples over a 30-second period and the $31^{st}$ one-second (1 s) vibration sample collected by the sampling device is the next vibration sample.

The sampling device may collect a next vibration sample and determine, using the trained anomaly detection model, whether the next vibration sample is anomalous. In some embodiments, the sampling device, when collecting a next vibration sample, determines whether a retrain counter has been exceeded before determining whether the next vibration sample is anomalous. For example, the retrain counter is exceeded if a number of collected samples exceeds the retrain counter. The number of vibration samples considered by the retrain counter may include the set of initial vibration samples plus a predetermined number of next vibration samples. If the number of detected samples exceeds the retrain counter, the sampling device collects a new set of vibration samples and retrains the anomaly detection model. For example, the collected next vibration sample becomes a first sample in a new initial set of samples used to retrain the models. For example, the sampling device collects a new initial set of samples, retrains the anomaly detection model based on the new initial set of samples, collects a subsequent next vibration sample, and determines, using the trained anomaly detection model, whether the subsequent next vibration sample is anomalous.

If the sampling device, using the anomaly detection model, determines that the next vibration sample is an anomalous vibration sample, the sampling device may increment an alarm counter. If an alert threshold is not exceeded after incrementing the alarm counter, the sampling device collects a subsequent next vibration sample and determines, using the anomaly detection model, whether the subsequent next vibration sample is an anomalous vibration sample. If an alert threshold is exceeded after incrementing the alarm counter, however, the sampling device reports an alarm for the next vibration sample before collecting the subsequent next vibration sample.

If the sampling device, using the anomaly detection model, determines that the next vibration sample is not an anomalous vibration sample, the sampling device continues to detect vibration samples and, for each detected vibration sample, may increment a retrain counter and also classify the vibration samples as anomalous and increments an alarm counter. When the alarm counter exceeds a threshold, the sampling device may report an alarm for the vibration sample to a management system via a network. In some embodiments, the sampling device displays the alarm via a user interface of the sampling device. In certain embodiments, the sampling device or the management system communicates instructions to an equipment (e.g., to the associated feed tube of the equipment) associated with the anomalous samples (e.g., instructions to shut off, instructions to perform an operation to remove an obstruction to a seed flow through the feed tube, or other operation), or otherwise alerts an operator of the equipment that anomalous samples have been detected. In some embodiments, as the sampling device continues to collect vibration samples, and the retrain counter exceeds a threshold, the sampling device collects a new initial set of samples, retrains the OVSCM based on the new initial set of samples, and continues to collect subsequent next vibration samples, classify the collected samples as anomalous or as belonging to a defined cluster and/or report alarm states. In some embodiments, when the retrain counter is exceeded, the sampling device retrains the OVSCM model using a completely new set of vibration samples. In other embodiments, the sampling device retrains the OVSCM model using a set of previously collected samples (e.g., 30 most recently collected vibration samples) and a new set of subsequently collected vibration samples (e.g., 30 newly collected vibration samples).

In certain embodiments, the sampling device may be manually calibrated and trained by the operator. In these embodiments, the operator interacts with the sampling device and labels specific time periods to correspond to different operating events including, but not limited to seed flow, engine idle, engine off, and seed flow stopped. Once these periods are captured and labeled, supervised machine learning models such as random forest, MCSVM (multiclass support vector machines) and boosted tree classifiers are trained based on subsamples in the labeled dataset.

In certain embodiments, as the sampling device continues to collect samples and is periodically retrained according to the retraining counter, the environment of the equipment changes. For example, as a planter equipment including a seed flow tube spreads seed in rows of a field, one or more environmental conditions may change over time (e.g., it begins raining, soil hardness changes as equipment enters a new section of the field, equipment begins to go uphill or downhill, or other environmental or operational change). In this example, vibrations produced by the planter equipment, particularly in the flow tube environment, are characteristically different than vibrations produced before the change in environmental or operating conditions. Because the sampling device periodically retrains the anomaly detection model, a baseline for the environment adapts to these changing environmental conditions and vibration samples that could otherwise be classified as anomalous (if the models were not periodically retrained) are classified as non-anomalous. In these examples, in the environment with changing conditions, decreasing the threshold for the retraining counter (decreasing the retraining period) results in greater number of vibration samples that are determined to be non-anomalous. In these examples, increasing the threshold for the retraining counter (increasing the retraining period) results in a greater number of vibration samples greater number of vibration samples that are classified as anomalous.

In certain embodiments described herein, the equipment comprises a planter equipment and a sampling device monitors a plurality of flow tubes of the planter equipment. For example, during operation of the planter equipment, seed or other material flows through each of the flow tubes and is distributed into an environment of the planter equipment. For example, the seed or other material is distributed into rows via the flow tubes onto a field as the planter equipment moves across the field. The sampling device communicates with each of a set of transducer devices, where each of the set of transducer devices is assigned to a respective specific flow tube of the planter equipment. In some embodiments, the sampling device is able to receive input samples from each transducer device and determine whether the input samples are anomalies or non-anomalous samples. In other embodiments, the sampling device receives input samples from each transducer device and classifies input samples by assigning them to one or more clusters (e.g., a blockage or a flow) representing a state of the respective flow tube. In an example, the sampling device uses a logistic regression algorithm to classify input samples associated with a transducer device as either describing a blockage of a flow tube (e.g., an anomaly) or a flow of the flow tube (e.g., a non-anomalous sample). The sampling device collects a predetermined amount (e.g., 2 seconds) of an input sample in a loop buffer for each of the flow tubes from the different transducers of the planter equipment. The algorithm cycles through the transducers in a circular (e.g., round-robin) flow. In some instances, the algorithm does not wait to sample one second of input sample at each new head but instead just retrieves the last one second of audio for that current head (specific transducer assigned to a specific flow tube). In some instances, the sampling device spends no more than a few milliseconds processing the input sample from each head.

Example of Classifying Vibration Samples in an Operating Environment of an Equipment Referring now to the drawings, FIG. 1 depicts an example of a computing environment 100 for classifying vibration samples in an operating environment of an equipment, according to certain embodiments described in the present disclosure. In some embodiments, the computing environment 100 includes an equipment 111, a transducer device 113, a sampling computing device 130, and a management computing system 150.

In the example depicted in FIG. 1, an operating site environment 110 includes an equipment 111, a transducer device 113, and a sampling computing device 130 that communicates via a data network 170 with a management computing system 150. In some embodiments, the operating site environment 110 includes multiple equipment 111. For example, each equipment is associated with a N flow tubes 112, 112-2, . . . 112-N, where each of the flow tubes 112, 112-2, . . . 112-N is assigned a corresponding transducer device 113, 113-2 . . . 113-N. In certain embodiments, the transducer 113 is a piezoelectric transducer that converts a detected vibration into an electrical signal. For example, a piezoelectric vibration transducer generates an electrical charge that is proportional to the deflection of the piezoelectric transducer caused by a vibration in an environment of the transducer 113. An example equipment 111 is a planter device including N seed flow tubes 112, 112-2, . . . 112-N. Each transducer device 113 (and 113-2, . . . 113-N) is affixed to its respective flow tube 112 (and 112-2, . . . 113-N), is a component of its respective flow tube 112 (and 112-2 . . . 112-N) or is otherwise within a predefined physical proximity to its respective flow tube 112 (and 112-2 . . . 112-N). Each transducer device 113, 113-2, . . . 113-N is communicatively coupled with the sampling computing device 130 via a local wired or wireless communication network. In an example, each transducer device 113, 113-2, . . . 113-N and the sampling computing device 130 communicate via a Bluetooth network, a Bluetooth low energy ("BLE") network, a Wi-Fi network, a near field communication ("NFC") network, or other wireless communication network. In other embodiments, the sampling computing device 130 and the transducer devices 113, 113-2, . . . 113-N are components of another device (e.g., the sampling computing device 130 and the transducer devices 113, 113-2, . . . 113-N are components of the equipment 111).

Each transducer device 113 includes a transducer 115, a processor 117, and a communication module 119. The transducer device 113, (1) detects, via the transducer 115, physical vibrations from an environment of its respective flow tube 112 and converts the physical vibrations to electrical signals, (2) generates, via the processor 117, an input sample 121 based on the electrical signals generated by the transducer 113, and (3) communicates, via the communication module 119, the input sample 121 to the sampling computing device 130. The input sample 121 generated by the transducer device 113 could be a waveform ("WAV") audio file, a MPEG-1 Audio Layer III ("MP3") file, a Windows media audio ("WMA") file, or other audio file format. The transducer device 113 could comprise or could be a component of a microphone device in some embodiments. In some examples, the transducer device 113 could include a musical pickup device, for example, a banjo pickup device or a guitar pickup device.

The sampling computing device 130 receives the input sample 121 from the transducer device 113. For example, the input sample 121 is in the form of an audio file. In the example depicted in FIG. 1, the sampling computing device 130 includes an equipment management module 131 and a data storage unit 133. In some examples, the sampling computing device 130 comprises a mobile computing device.

The equipment management module 131 communicates with one or more transducer devices 113, 113-2, . . . 113-N in the operating site environment 110, where each respective transducer device 113, 113-2, . . . and 113-N is assigned to a respective flow tube 112, 112-2, . . . and 112-N. In certain embodiments, each respective transducer device 113 is associated with a plurality of flow tubes 112. For example, the planter equipment 112 may have 16 flow tubes 112 and a first transducer 113 is assigned to a first four flow tubes 112, a second transducer 113 is assigned to a second four flow tubes 112, a third transducer 113 is assigned to a third four flow tubes 113, and a fourth transducer 113 is assigned to a last four flow tubes 112 (of the 16 total flow tubes 112). In certain examples, one or more functions described as being performed by the equipment management module 131 may instead be performed via management computing system 150, which communicates with the sampling computing device 130 via the network 170. In certain embodiments, the equipment management module 131 comprises an application that enables a user (e.g., an operating site manager or an operator of one or more equipment 111) to monitor status information of one or more flow tubes 112, 112-2, . . . 112-N of the equipment 111 in the operating site environment 110. The user may access the application via a user interface of the sampling computing device 130. In certain examples, the application is a web browser application that communicates with the management computing system 150. In some examples, the sampling computing device 130 may execute one or more of the edge processing 120 operations or the site processing operations 140 depicted in FIG. 1 in response to receiving an input via the equipment management application from a user of the sampling computing device 130.

The data storage unit 133 includes a local or remote data storage structure accessible to the sampling computing device 130 suitable for storing information. A data storage unit can store relevant data as one or more databases, one or more matrices, computer code, etc. The data storage unit 133 may store certain training data and hyperparameters information used to train the model 123 used in the edge processing 120 operations described herein. The training data could comprise a threshold number of input samples 121 received by the sample computing device 130 from the transducer device 113. The data storage unit 133 could store anomalies 124 and classified samples 125 outputted via the model 123 (including the anomaly detection model and the clustering module). In certain examples, the sampling computing device stores raw input samples 121 received from the transducer device 113 and the sampling computing device 130 accesses a set of the stored raw input samples 121 and trains the model 123 using the set during edge processing 120.

In the embodiment depicted in FIG. 1, the sampling computing device 130 performs edge processing 120 operations for each flow tube 112. In edge processing 120, the sampling computing device 130 receives input samples 121 (e.g., vibration samples) from the transducer device 113 for the associated flow tube 112 and, for each received input sample 121, the sampling computing device 130 generates a sample representation 122 based on the received input sample 121, inputs the sample representation to the model 123, which either categorizes the input sample 121 as an anomaly 124 or as a classified sample 125. For example, the sampling computing device 130 performs one or more pre-processing operations on the input sample 121 audio file received from the transducer device 113 to generate the input sample representation 122 that is then used by the model 123 to either detect an anomaly 124 or a classified sample 125. In certain embodiments described herein, the model 123 includes an anomaly prediction model. In other embodiments, the model 123 includes an anomaly prediction model and a cluster assignment model. For example, the classified sample 125 could be classified into a cluster of a set of clusters identified by the cluster assignment model. As indicated in FIG. 1, edge processing 120 may be continuous. For example, the sampling computing device 130, after either determining that the previous input sample representation 122 is an anomaly 124 or a classified sample 125 (which may, in some embodiments, be classified into a cluster) by assigning the previous input sample representation 122 to a cluster, receives a subsequent input sample 121, preprocesses the subsequent input sample 121 to generate a subsequent input sample representation 122, and either (A) determines, using the anomaly detection model, that the subsequent input sample representation 122 is an anomaly 124 or (B) is a classified sample 125. Though not depicted in FIG. 1, edge processing 120 further includes retraining the model 123 (including the anomaly detection model and, in some embodiments, the cluster assignment model) when the number of input samples 121 received exceeds a threshold number (e.g., thirty, sixty, one hundred, or other predefined threshold number). Also, edge processing 120 could include determining that a number of detected anomalies 124 has exceeded an alert threshold. For example, the alert threshold comprises five, ten, twenty, or other predefined number of detected anomalies 124. In certain examples, the alert threshold comprises a predefined number of successive detected anomalies 124 or a predefined number of detected anomalies 124 within a time period. Certain aspects of edge processing 120 operations are described in FIG. 2 at blocks 210-280.

In the embodiment depicted in FIG. 1, the sampling computing device 130 performs site processing 140 operations for each equipment 111. In site processing 140, the sampling computing device 130 generates an alert report 141. In some embodiments, site processing 140 includes performing equipment management 143 in accordance with the alert report 141. The sampling computing device 130 could generate the alert report 141 in response to determining that the number of anomalies 124 detected exceeds an alert threshold. The alarm report 141 could include the anomalous input samples 121 (or anomalous input sample representations 122) for which the anomalies 124 were detected. The sampling computing device 130 could transmit the report to the management computing system 150. Equipment management 143 operations could include communicating instructions to the equipment 111 associated with the transducer device 113 which collected the input samples 121 corresponding to input sample representations 122 categorized by the sampling computing device 130 as anomalies 124. In some examples, the instructions could include an instruction to shut off or disable the equipment 111, disable one or more functions of the equipment 111, disable a flow tube 112 associated with the transducer 113 from which the audio sample comprising the anomaly 124 was received, perform one or more operations of the equipment 111, or other appropriate instructions to address the alert report 141 generated in response to the exceeded alert threshold. In other examples, the equipment management 143 operations could include communicating instructions to a computing device associated with an operator of the equipment 111 (e.g., a mobile device of the equipment 111 operator) with instructions for the operator of the equipment. For example, the instructions include instructions to unblock the flow tube 112. Certain aspects of site processing 140 operations are described in FIG. 2 at blocks 285-290.

In the embodiment depicted in FIG. 1, the edge processing 120 operations and site processing 140 operations are performed by the sampling computing device 130. However, in some embodiments, the edge processing 120 operations and the site processing 140 operations, or one or more sub-operations of these operations, could be performed by the management computing system 150, which communicates with the sampling computing device 130 via the network 170.

The management computing system 150 executes one or more software modules that implement one or more online services for the sampling computing device 130 at the operating site environment 110 via the network 170. In certain embodiments, the management computing system 150 communicates with sampling computing devices 130 at various operating site environments 110 via the network 170. An example management computing system 150 includes a multi-operating-site analytics module 151, a data storage unit 153, and a communication module 155.

The management computing system 150 may be associated with the equipment management module 131 of the sampling computing device 130. In an example, the equipment management module 131 comprises an equipment management application resident on the sampling computing device 130 and communicates with the management computing system 130 to access one or more online services provided by the management computing system 130. Example online services could include edge processing 120 operations, site processing 140 operations, and/or cloud processing 160 operations described herein. In an example, the user of the sampling computing device 130 accesses an online service of the management computing system 150 via the network 170 and downloads the equipment management module 131 or equipment management application onto the sampling computing device 130. The multi-operating-site analytics module 151 may perform one or more operations described herein as being performed by the sampling computing device 130 or by the equipment management module 131.

An example of a data storage unit 153 includes a local or remote data storage structure accessible to the management computing system 130 suitable for storing information. A data storage unit can store relevant data as one or more databases, one or more matrices, computer code, etc. In some examples, one or more functions described herein as performed by the data storage unit 153 may be performed by a data storage unit 133 of the sampling computing device 130. In some examples, one or more functions described herein as performed by the data storage unit 133 of the sampling computing device 130 may be performed by a data storage unit 153.

One or more of the sampling computing device 130 and the management computing system 150 could include a device having a communication module capable of transmitting and receiving data over a data network 170. For instance, one or more of the sampling computing device 130 and the management computing system 150 could include a server, a desktop computer, a laptop computer, a tablet computer, a television with one or more processors embedded therein and/or coupled thereto, a smart phone, a handheld computer, or any other wired or wireless, processor-driven device.

Examples of the data network 170 include, but are not limited to, internet, local area network ("LAN"), wireless area network, wired area network, wide area network, and the like. For example, the data network 170 includes a wired or wireless telecommunication means by which network systems can communicate and exchange data. For example, each data network 170 can be implemented as, or may be a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a Wi-Fi network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that can exist in a computer-based environment.

Figure 2:
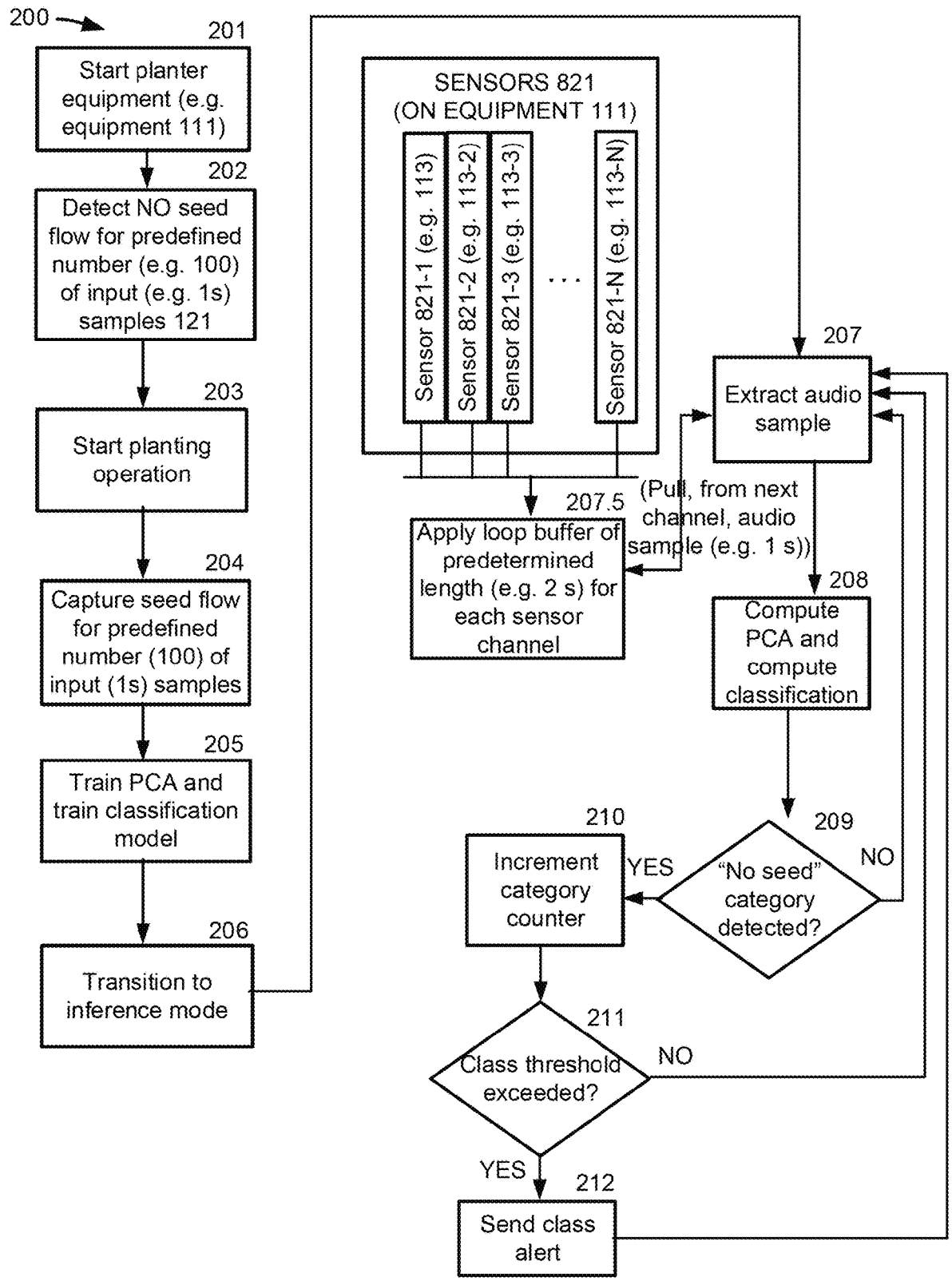
FIG. 2 depicts an example of a method for detecting anomalous vibration samples in a flow tube environment of an equipment, according to certain embodiments described in the present disclosure.

Examples of Operations for Classifying Vibration Samples in an Operating Environment of an Equipment FIG. 2 depicts an example of a method 200 for controlling multiple sensor devices in an equipment 111, in accordance with certain example embodiments. For illustrative purposes, the method 200 is described with reference to the components illustrated in FIG. 1, though other implementations are possible. For example, the program code for the equipment management module 131, which is stored in a non-transitory computer-readable medium, is executed by one or more processing devices to cause the sampling computing device 130 to perform one or more operations described herein. For example, the program code for the multi-operating-site analytics module 151 and/or one or more online services provided by the management computing system 150, which is stored in a non-transitory computer-readable medium, is executed by one or more processing devices to cause the management computing system 150 to perform one or more operations described herein. The operations described herein are described as being performed by the sampling computing device 130. However, one or more of these operations described in FIG. 2 may be performed by the management computing system 150 instead of or in addition to being performed by the sampling computing device 130.

In certain embodiments, the sampling computing device 130 device performs the method of FIG. 2 for each of a set of N transducers 113, 113-2, . . . 113-N which detect vibrations in respective environments of a set of N flow tubes 112, 112-2, . . . 112-N. For example, sampling computing device 130 receives audio samples of an environment of flow tube 112 from transducer 113, audio samples of an environment of flow tube 112-2 from transducer 113-2, and so forth. The sampling computing device 130 analyzes the audio samples to monitor the flow tubes 112, 112-2, . . . 112-N for anomalous vibrations that could indicate that the equipment 111 is not operating efficiently. For example, flow tube 112-2 of the N flow tubes 112, 112-2, . . . 112-N is blocked and vibrations caused by the blockage causes an audio sample to be received by the sampling computing device 130 from the associated transducer 113-2 and the sampling computing device 130 determines that the input sample 121 is an anomaly 124 responsive to applying a model 123 (a trained anomaly detection model) to an input sample representation 122 generated from the input sample 121. In this example, another flow tube 112 of the N flow tubes is not blocked and causes an audio sample vibrations caused by normal operation of the flow tube 112 an audio sample to be received by the sampling computing device 130 from the associated transducer 113-2 and the sampling computing device 130 determines that the input sample 121 is a classified sample 125 responsive to applying a model 123 (a trained logistic regression model) to an input sample representation 122 generated from the input sample 121. Accordingly, the sampling device 130 can monitor each of a set of transducer devices 113, 113-2, . . . 113-N to determine whether associated flow tubes 112, 112-2, . . . 112-N are operating normally or anomalously (e.g., are blocked or material is otherwise not flowing through). A transducer device 113 can be affixed to a flow tube 112 of the equipment 111, can be a component of a flow tube 112 of the equipment 111, or that is otherwise within a predefined proximity (e.g., within one meter, two meters, or other predefined distance) to a flow tube 112 or group of flow tubes 112 of the equipment 111 such that the transducer device 113 is able to detect physical vibrations in an environment of the flow tube 112. An equipment 111 personnel may place the transducer device 113 in the desired location on or near the flow tube 112 of the equipment 111 or within the predefined proximity to the flow tube 112.

At block 201, the method 200 involves starting a planter equipment 111. The planter equipment 111 includes plurality of flow tubes. For example, during an operation of the planter equipment, seed or other material flows through each of the flow tubes 112 (e.g., 112, 112-1, . . . 112-N as illustrated in FIG. 1) and is distributed into an operating environment 110 (e.g. a field) of the planter equipment 111.

At block 202, the method 200 involves detecting, by the sampling computing device 130, no seed flow for a predefined number of input samples 121. The sampling device communicates with each of a set of N sensor devices 221, for example, sensor devices 221-1, 221-2, 221-3, . . . 221-N as depicted in FIG. 2, which are assigned to specific flow tubes 112 (or to a specific group of flow tubes 112) of a set of N flow tubes (e.g., flow tubes 112, 112-2, . . . 112-N depicted in FIG. 1). The N sensor devices 221 may comprise N transducer devices 113 as depicted in FIG. 1 (e.g., transducer devices 113, 113-1, . . . 113-N), where each of the set of sensor devices 221 is assigned to a respective specific flow tube 112 (or to a specific group of flow tubes 112) of the planter equipment 111. The sampling computing device receives input samples 121 from each of the sensor devices 221 which are assigned to specific flow tubes 112 or to specific groups of flow tubes 112. For example, the transducer device 113 converts physical vibrations detected in an environment of the flow tube 112 (e.g., within and around the flow tube 112) or of the group of flow tubes 112 into electrical signals (e.g. analog voltages), which it transmits to the sampling computing device 130. In some embodiments, the sampling computing device 130 converts the electrical signals output by the transducer device 113 to digital amplitude measurements and, using a discrete Fourier transform, converts the amplitude measurements to frequency measurements in the form of a vibration input sample 121. In some embodiments, the transducer device 113 detects vibration input samples 121 periodically. For example, at every predefined period of time (e.g., at every one second), the transducer device 113 detects a new vibration input sample 121 of a predefined amount of time (e.g., a one second vibration sample). In certain examples, the transducer device 113, based on the electrical signals output by the transducer device 113, generates an audio file that represents each vibration input sample 121. In other examples, the transducer 113 device transmits a combined audio file that represents multiple vibration input samples 121 to the sampling computing device 130 and the sampling computing device 130 generates an audio file for each vibration input sample 121 from the combined audio file. An example audio file includes a sample rate (e.g., a number of samples per second). The sample rate can be configured. An example of an audio file representing a vibration input sample 121 is described in FIG. 3.

At block 203, the method 200 involves starting a planting operation of the planter equipment 111. For example, the seed or other material is distributed into rows via the flow tubes 112 onto a field as the planter equipment 111 moves across the field. In an example, an operator of the planter equipment 111 manually starts the planter equipment 111. In another example, the sampling computing device 130 or the management computing device 150 transmits instructions to the planter equipment to start the planting operation. In some instances, the planting operation of the planter equipment 111 instructs the planter equipment 111 to release seed via the flow tubes 112 of the planter equipment 111 into the operating environment 110.

At block 804, the method 200 involves capturing, by the sampling computing device, a seed flow for a predefined number of input samples 121. For example, the sampling computing device 130 receives input samples 121 from each of the sensor devices 221 which are assigned to specific flow tubes 112 or to specific groups of flow tubes 112. For example, the transducer device 113 converts physical vibrations detected in an environment of the flow tube 112 (e.g., within and around the flow tube 112) or of the group of flow tubes 112 into electrical signals (e.g., analog voltages), which it transmits to the sampling computing device 130. In some embodiments, the sampling computing device 130 converts the electrical signals output by the transducer device 113 to digital amplitude measurements and, using a discrete Fourier transform, converts the amplitude measurements to frequency measurements in the form of a vibration input sample 121. In some embodiments, the transducer device 113 detects vibration input samples 121 periodically. For example, at every predefined period of time (e.g., at every one second), the transducer device 113 detects a new vibration input sample 121 of a predefined amount of time (e.g., a one second vibration sample). In certain examples, the transducer device 113, based on the electrical signals output by the transducer device 113, generates an audio file that represents each vibration input sample 121. In other examples, the transducer 113 device transmits a combined audio file that represents multiple vibration input samples 121 to the sampling computing device 130 and the sampling computing device 130 generates an audio file for each vibration input sample 121 from the combined audio file. An example audio file includes a sample rate (e.g., a number of samples per second. The sample rate can be configured. An example of an audio file representing a vibration input sample 121 is described in FIG. 3.

The sampling computing device 130 may determine whether an initial sample quantity threshold defining a predefined number of initial vibration input samples 121 is met. For example, the predefined amount comprises 5, 20, 30, 100, or other predefined number of vibration samples. In another example, the predefined amount of vibration samples comprises vibration samples detected for a predefined period (e.g., a number of vibration samples detected over a five-minute period). In some instances, when configuring the predefined amount, as the predefined amount is increased, an accuracy of one or more outputs generated using the model (which may include a cluster assignment model and/or an anomaly detection model) increases but a time of a training phase is increased. In some instances, when configuring the predefined amount, as the predefined amount is decreased, an accuracy of one or more outputs generated using the anomaly detection and cluster assignment models decreases but the time of the training phase is decreased. The sampling computing device 130 could configure a training set counter to increment as the sampling computing device 130 receives each initial vibration input sample 121.

In the embodiments described herein, physical vibrations can be present and detected in the environment of the flow tube 112 or group of flow tubes 112 in response to material (e.g., seeds, fertilizer, etc.) flowing through the flow tube 112. In certain examples, a first material (e.g., corn seed) flowing through the flow tube 112 or group of flow tubes 112 may generate physical vibrations of specific characteristics when compared to characteristics of physical vibrations generated by another material (e.g., cotton seed). Also, an equipment 111 may generate vibrations with varying characteristics corresponding to an operation or state of the equipment 111 (equipment 111 is in idle, drive, reverse, drive while material flowing through flow tube 112, idle while material is flowing through the flow tube 112, etc.). Also, an equipment 111 may generate vibrations with varying characteristics corresponding to a condition of the operating environment 110 (e.g., it is raining in the field in which the planter equipment 111 is operating). Also, the flow tube 112 environment may generate vibrations with varying characteristics corresponding to a condition, state, or other property of a material with which the flow tube 112 or group of flow tubes 112 is interacting (e.g., a consistency or flow rate of the material through the flow tube 112). Also, the flow tube 112 itself, or group of flow tubes 112, may generate vibrations.

Figure 3:
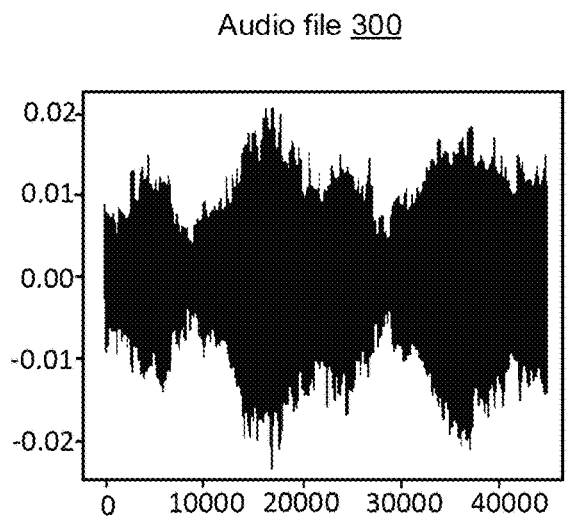
FIG. 3 depicts an illustration of example audio file representing a vibration input sample, according to certain embodiments described in the present disclosure.
Figure 4:
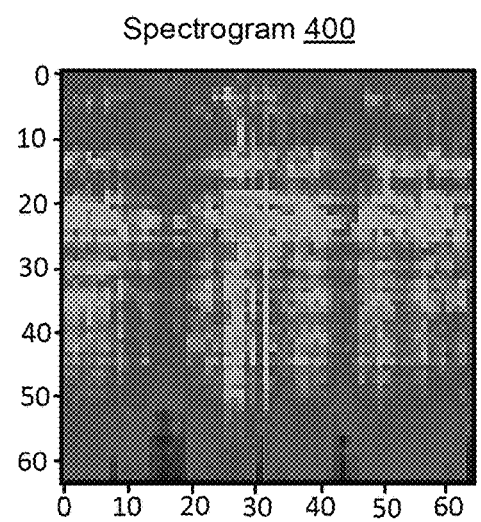
FIG. 4 depicts an illustration of an example audio spectrogram, according to certain embodiments described in the present disclosure.

At block 205, the method 200 involves training, by the sampling computing device 130, a principal component analysis (PCA) on the received input samples 121 and training a classification model 123. In some instances, the sampling computing device 130 generates input sample representations 122 associated with each of the received input samples 121. In certain embodiments, the sampling computing device 130 pre-processes the initial vibration input samples 121 in the training set to generate an input sample representation 122 corresponding to each input sample 121. In some instances, each input sample 121 received by the sampling computing device 130 comprises a one-dimensional array in the time amplitude domain. An example of a vibration input sample 121 represented by a one-dimensional array is depicted in FIG. 3. In some instances, the sampling computing device 130 converts input samples 121 represented by a one-dimensional array into a 2D array which is represented as time frequency (e.g., an audio spectrogram). For example, an audio spectrogram is a two-dimensional array that represents intensities of various frequencies present in a vibration input sample 121. An example of an audio spectrogram is depicted in FIG. 4. In some instances, the sampling computing device 130 converts the spectrogram for each vibration input sample 121 back into a one-dimensional array to generate the respective input sample representation 122.

The sampling computing device 130 performs a principal component analysis ("PCA") on the training set of input sample representations 122. PCA identifies the principal aspects or dimensions of the data. In some instances, the number of dimensions determined via PCA is large and the sampling computing device 130 reduces the dimensions determined via PCA to a lower number of dimensions (e.g., to a smaller dimensional space). In some examples, the PCA reduces the number of dimensions to a predefined number of dimensions (e.g., three dimensions, five dimensions, ten dimensions). Accordingly, the clusters that are discovered in the PCA do not have a ground truth. However, in some instances, the sources of different input samples 121 could be controlled.

The sampling computing device 130 trains, using the PCA reduced dimensional data, a classification model 123 (e.g., a logistic regression (supervised learning) algorithm) that is trained to classify input samples into various categories. In certain embodiments, the categories comprise "blockage" or "no seed flow." However, an operator of the sampling computing device 130 may configure the sampling computing device 130 to train the classification model 123 to recognize any number of categories which correspond to operating status or condition of the flow tube 112 or group of flow tubes 112 to which the transducer 113 is assigned. For example, the categories could comprise categories of type of material that is flowing as well as indicating levels of blockage, for example, "flow of corn seed" "flow of cotton seed, planter equipment moving" "flow of barley seed," "blockage," "partial blockage," and "no flow of seed." In another example, the categories could include an indication of whether the equipment 111 is moving, for example, the categories could comprise "flow of seed, planter equipment moving," "flow of seed, planter equipment moving within a predefined range of speed," "partial blockage, planter equipment moving," "full blockage, planter equipment moving," "flow of seed, planter equipment stopped," "partial blockage, planter equipment stopped," "blockage, planter equipment stopped." In some instances, the operator of the sampling computing device 130 can configure the sampling computing device 130 to train the classification model 123 on any number of, combination of, and sub combination of categories corresponding to operating conditions of the flow tube 112 or group of flow tubes 112. For example, a category could comprise "flow of corn seed, planter equipment moving in a range of 1-2 miles per hour, partial blockage of flow tube." During the training phase, the planter equipment 111 performs at the various operating conditions specified by the operator associated with the various categories so that input samples of the flow tubes 112 (or groups of flow tubes 112) to which the respective transducers 113 are assigned can provide input samples 121 corresponding to each of the various operator-defined categories so that the classification model 123 can be adequately trained to recognize each of the operator-defined categories.

In certain examples, the classification model 123 comprises a logistic regression model. However, other types of models may be used instead of or in addition to a logistic regression model. For example, unsupervised logistic regression models, a tree-based model, a one class vector support machine ("OCSVM"), random forest model, a k-nearest neighbors ("KNN") model. In certain embodiments, a model including one or more of the logistic regression model and/or these other model types may be used. For example, block 205 may involve training a model 123 which includes (1) an anomaly detection model (e.g., an OCSVM) which is trained to determine whether an input sample 121 or input sample representation 122 is an anomaly 124 and which also includes (2) the logistic regression model trained to assign an input sample to a category of a predetermined set of categories.

For example, a multinomial logistic regression ("MCLR") model is a cluster assignment model and is trained to assign a vibration input sample 121 that is not part of the training set to a cluster of the set of clusters that were determined via the PCA. In an example, the two-dimensional spectrogram derived from the received vibration input sample 121 for each vibration input sample 121 of the set of training data is used as training features for training the MCLR model and the respective cluster to which the input sample representation 122 corresponding to the initial vibration input sample 121 belongs is used as a training target. In some instances, the dimensional data from the PCA analysis of the training set of input sample representations 122 is used to train the MCLR model. In some instances, the sample computing device 130 clusters the input sample representations 122 of the training set to form a ground truth based on the reduced-dimension PCA dimensional data and then trains the model using the full (non-reduced) PCA dimension data to train the MCLR model. In some embodiments, instead of a MCLR model, the cluster assignment model is another type of clustering model, for example a K Nearest Neighbor model, and the sampling computing device 130 trains the clustering assignment model.

For example, an anomaly detection model comprising a one class support vector machine ("OCSVM") is trained and then used for inference. For example, once a training set has been reduced to principal dimensions using PCA, the sampling computing device 130 uses a cluster algorithm to cluster the input sample representations 122 (representing initial vibration input samples 121) into a set of clusters and assign each input sample representation 122 of the training set to a respective cluster of the set of clusters. In some examples, the sampling computing device 130 uses a k-nearest-neighbors ("KNN") clustering algorithm to cluster the input sample representations 122. In some instances, the number of dimensions determined via PCA is large and the sampling computing device 130 reduces the dimensions determined via PCA to a lower number of dimensions (e.g., to a smaller dimensional space). In some examples, the PCA reduces the number of dimensions to a predefined number of dimensions (e.g., three dimensions, five dimensions, ten dimensions). Accordingly, the clusters that are discovered in the PCA do not have a ground truth. However, in some instances, the sources of different input samples 121 could be controlled.

At block 206, the method 200 involves transitioning, by the sampling computing device 130, to an inference mode. For example, blocks 201-204 involve receiving an initial set of input samples 121 for training of the classification model in block 205 to recognize an occurrence of one or more categories. After training the model 123, the sampling computing device 130 uses the trained model 123 to classify received input samples 121 as one of a set of categories as well as incrementing alarm and/or retrain counters in the following steps.

Following are specific examples of types of physical vibrations that could be generated in an environment of the flow tube 112 in a vicinity of which the transducer 113 detects the physical vibrations. However, these examples are not exclusive and other situations in the environment of the flow tube 112 (or group of flow tubes 112) not listed herein may result in detectable physical vibrations. In each of these examples, the respective physical vibration is detected by the sensor 221 (e.g., transducer 133 device) of the assigned flow tube 112 or assigned group of flow tubes 112. Each of the example vibrations generated in each of these examples has different characteristics from the vibrations generated in the other examples.

For example, a physical vibration in the operating site environment 110 is generated in response to the equipment 111 (e.g., a planter equipment 111) releasing a material (e.g., seed) through the flow tube 112. In this example, the flow tube 112 of the equipment 111 may produce a vibration with different characteristics than vibrations generated when no material is flowing through the flow tube 112. Accordingly, characteristics of physical vibrations generated by the flow tube 112 of the equipment 111 may change if the equipment 111 transitions from releasing the material via the flow tube 112 to not releasing the material via the flow tube 112, or vice versa. Further, in this example, the physical vibration produced by a material of a first type (e.g., cotton seed) passing through the flow tube 112 differs from a physical vibration produced by a material of a second type (e.g., corn seed) passing through the flow tube 112. In another example, a physical vibration having first characteristics is generated in response to a flow of a substance through a conveyance mechanism (e.g., a tube, a pipe, a conduit, etc.) of an equipment and a physical vibration having second characteristics is generated in response to a blockage in the flow of the substance through conveyance mechanism of the equipment. In this other example, characteristics of physical vibrations can vary based on a flow rate of the substance through the conveyance mechanism, a type of substance flowing through the conveyance mechanism, or other physical property of the substance flowing through the conveyance mechanism.

In another example, characteristics of the physical vibrations detected by the transducer 113 may change depending on which surface on which the equipment 111 is operating (e.g., a wet field, vs a dry field, clay vs topsoil, etc.). In another example, a physical vibration is detected in the operating site environment 110 in response to the equipment 111 coming into proximity to another equipment 111 such that vibrations generated by the other equipment 111 or generated as a result of the coming into proximity with the other equipment 111 can be detected. In yet another example, a physical vibration is generated corresponding to a measure of an operating state of an engine or other component of the equipment 111 and characteristics of the physical vibration may change as the operating state of the engine or other component of the equipment 111 changes. In another example, a physical vibration is generated in response to an environmental sound. In another example, a physical vibration is generated by or caused by operating site personnel in proximity of the flow tube 112 of the equipment 111. In yet another example, a physical vibration is generated in response to an environmental condition in the operating site environment 110.

At block 207, the method 200 involves sampling, by the sampling computing device 130, audio signals from a set of sensors 221 on the equipment 111. As part of implementing block 207, at block 207.5, the method 200 involves applying a loop buffer of a predetermined duration for each sensor 221 channel. For example, each of a set of N sensors 221 (e.g., 221-1, 221-2, 221-3, . . . 221-N) represent a respective transducer 113 (e.g., 113, 113-2, 113-3, . . . 113-N), which is assigned either to a single flow tube 112 or to a specific group/set of flow tubes 112 of the equipment 111. Each sensor 221 channel represents a continuous receipt of vibration input samples 121 from the respective sensor 221 associated with the respective sensor 221 channel. For example, the transducer device 113 converts physical vibrations detected in an environment of the flow tube 112 (e.g., within and around the flow tube 112) or of the group of flow tubes 112 into electrical signals (e.g., analog voltages), which it transmits to the sampling computing device 130. In some embodiments, the sampling computing device 130 converts the electrical signals output by the sensor 221 to digital amplitude measurements and, using a discrete Fourier transform, converts the amplitude measurements to frequency measurements in the form of a vibration input sample 121. In some embodiments, the sensor 221 detects vibration input samples 121 periodically. For example, at every predefined period of time (e.g., at every one second), the transducer device 113 detects a new vibration input sample 121 of a predefined amount of time (e.g., a one second vibration sample). In certain examples, the transducer device 113, based on the electrical signals output by the transducer device 113, generates an audio file that represents each vibration input sample 121. In other examples, the sensor 221 transmits a combined audio file that represents multiple vibration input samples 121 to the sampling computing device 130 and the sampling computing device 130 generates an audio file for each vibration input sample 121 from the combined audio file. An example audio file includes a sample rate (e.g., a number of samples per second. The sample rate can be configured. An example of an audio file representing a vibration input sample 121 is described in FIG. 3.

As part of block 207, the method 200 involves applying a loop buffer of a predetermined duration for each sensor 221 channel. As described previously, the sampling computing device 130 continuously receives and processes input samples 121 from each sensor 221. In an example, the predetermined duration is two (2) seconds, four (4) seconds, or other predetermined duration. For example, for each sensor 221 channel, the sampling computing device 130 continuously receives the input samples 121. The sampling computing device 130 stores or otherwise retains input samples 121 representing a most recent predetermined duration (e.g., two seconds) of received audio data for each sensor 221 channel and deletes any input samples 121 which are older than the predetermined duration (e.g., two seconds) before a current time.

In certain embodiments, the sampling computing device 130, as part of applying the loop buffer, preprocesses the input samples 121 to generate input sample representations 122 which represent the most recent predetermined duration of received audio data for each sensor 221 channel. In some instances, each input sample 121 received by the sampling computing device 130 comprises a one-dimensional array in the time amplitude domain. An example of a vibration input sample 121 represented by a one-dimensional array is depicted in FIG. 3. In some instances, the sampling computing device 130 converts input samples 121 represented by a one-dimensional array into a 2D array which is represented as time frequency (e.g., an audio spectrogram). For example, an audio spectrogram is a two-dimensional array that represents intensities of various frequencies present in a vibration input sample 121. An example of an audio spectrogram is depicted in FIG. 4. In some instances, the sampling computing device 130 converts the spectrogram for each vibration input sample 121 back into a one-dimensional array to generate the respective input sample representation 122. The input sample representations 122 comprising one-dimensional arrays are used as input for clustering the input samples 121 as well as model 123 training (including training an anomaly detection model and a cluster assignment model).

As shown in FIG. 2, when extracting the audio sample in block 207 via application of the loop buffer in block 207.5, the method involves extracting, from a next sensor 221 channel, an input sample 121 (or input sample representation 122) of a predefined duration (e.g., 1 second, 1.5 seconds, or other predefined duration) and performing blocks 808-813, as applicable, to the extracted input sample 121. The predefined duration of the extracted input sample 121 or input sample representation 122 (e.g., 1 second) is shorter than the predefined duration of the loop buffer (e.g., two seconds), ensuring that enough captured and preprocessed sensor 221 channel audio data is available for extraction by the sample computing device 130. The method 200 further involves, in a circular/round robin manner, cycling through each of the sensor 221 channels and performing blocks 808-813, as applicable to a successive extracted input sample 121 from each successive sensor 221 channel. Accordingly, each of the following blocks 808-813 is described for a single audio sample 121 originating from a single sensor 221 channel (and associated transducer 113 device which monitors an assigned flow tube 112 or an assigned group of flow tubes 112 of the equipment 111), but these blocks, as applicable, are performed for input samples 121 (or input sample representations 122) of each of extracted sensor 221 channel for the most recent predetermined duration in a successive manner as the sampling computing device 130 cycles through the loop buffer.

Figure 5:
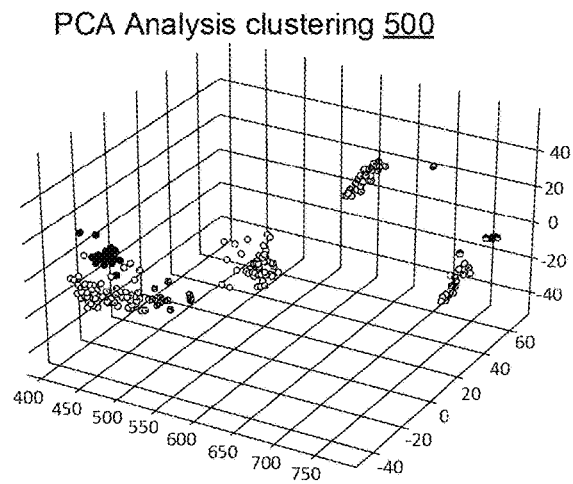
FIG. 5 depicts an illustration of example clustering of vibration input samples from performing a principal components analysis, according to certain embodiments described in the present disclosure.

At block 208, the method 200 involves computing, by the sampling computing device, PCA for the received sample of block 207 and computing a classification using the classification model 123. For example, the classification model 123 is applied to the input sample 121 to assign a category for the input sample 121 among a set of predetermined categories upon which the classification model 123 is trained. In some instances, the sampling computing device 130 performs a principal component analysis ("PCA") on the training set of input sample representations 122. PCA identifies the principal aspects or dimensions of the data. Once the training set has been reduced to these principal dimensions, the sampling computing device 130 uses a cluster algorithm to cluster the input sample representations 122 (representing initial vibration input samples 121) into a set of clusters and assign each input sample representation 122 of the training set to a respective cluster of the set of clusters. In some examples, the sampling computing device 130 uses a k-nearest-neighbors ("KNN") clustering algorithm to cluster the input sample representations 122. In some instances, the number of dimensions determined via PCA is large and the sampling computing device 130 reduces the dimensions determined via PCA to a lower number of dimensions (e.g., to a smaller dimensional space). In some examples, the PCA reduces the number of dimensions to a predefined number of dimensions (e.g., three dimensions, five dimensions, ten dimensions). Accordingly, the clusters that are discovered in the PCA do not have a ground truth. However, in some instances, the sources of different input samples 121 could be controlled. An example clustering of input sample representations 122 (corresponding to a training set of initial vibration input samples 121) via PCA is depicted in FIG. 5.

Figure 6:
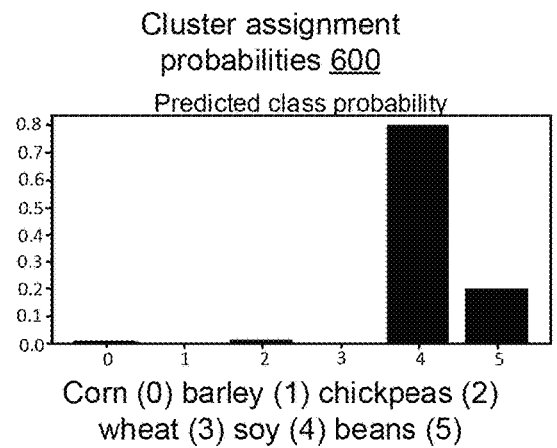
FIG. 6 depicts an illustration of cluster assignment probabilities predicted for an input sample, according to certain embodiments described in the present disclosure.

In an example, the sampling computing device 130 inputs the next input sample representation 122 (from the current sensor 221 channel in the loop buffer) to the trained classification model 123. In some instances, the sampling computing device 130 inputs the two-dimensional spectrogram (the input sample representation 122) to the trained logistic regression model 123 or inputs the raw input sample 121 to the trained classification model 123. The trained classification model 123 assigns the input sample representation 122 (or input sample 121, if input instead) to one of the sets of predefined categories known to the trained classification model 123. The classification model 123 outputs, for the input data corresponding to the next input sample 121 (which could be the input sample 121 itself or an input sample representation 122), a category assignment corresponding to a category of the predefined set of categories learned during the training phase. In certain examples, the cluster assignment model 123 determines a probability, for the input sample 121, that the input sample 121 should be assigned to each category of the set of predefined categories and selects the category corresponding to the greatest probability. FIG. 6 depicts an illustration of probabilities that an input sample belongs to each category of a set of predefined categories which the classification model 123 is trained to recognize.

Figure 7:
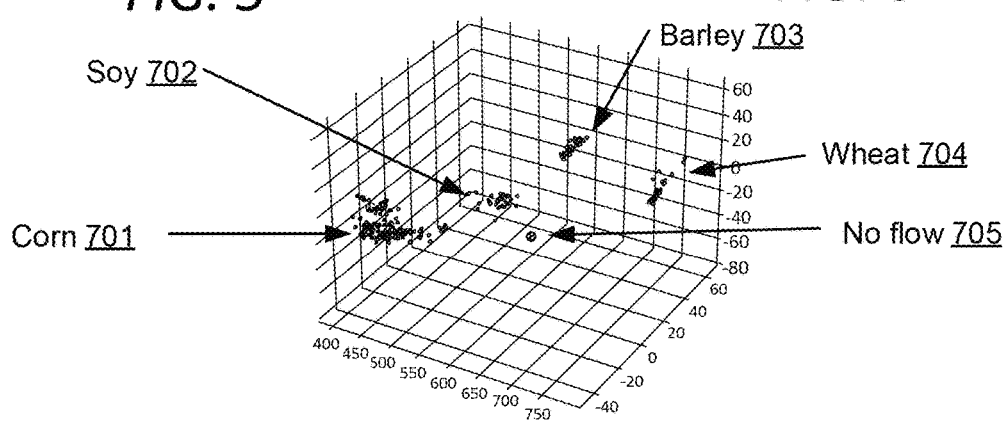
FIG. 7 provides an example illustration of input samples assigned to a set of predetermined categories known to a trained model.

At block 209, the method 200 involves determining, by the sampling computing device 130, whether the inference determined at block 208 belongs to a "no seed" or "no seed flow" category that known to the trained classification model 123 (or other trained model 123 that is used), or if it belongs to another one of the predetermined set of categories that the classification model 123 is trained on. For example, at block 202, the classification model 123 was trained to recognize no seed flow, while the equipment 111 was operating with no seed flowing through the flow tubes 112. For example, the classification model 123 (or other model 123) is trained in block 205 to recognize a set of predetermined categories, which, in some embodiments, are configured by an operator of the sampling computing device 130. In some instances, blocks 209-212 as applicable are performed for each of the predetermined categories so that a counter and alarm feature can monitor the occurrence and/or duration of occurrence of operating conditions associated with each of the predefined categories. FIG. 7 provides an example illustration of input samples 121 (in some instances, represented by input sample representations 122) assigned to a set of predetermined categories known to a trained classification model 123.

If the sampling computing device 130 does not detect the "no seed flow" category for the current input sample 121, the method 200 returns to block 207 and the sampling computing device 130 extracts another input sample 121 (or input sample representation 122) via the loop buffer of block 207.5 to compute another inference, that is, to assign the next input sample 121 for the next sensor 221 channel to a category of set of predetermined categories. In some embodiments, however, the sampling computing device 130 always determines that the input sample 121 corresponds to a category of the set of predefined categories. In some embodiments, as mentioned previously, the trained logistic regression model is combined with an OCSVM in a trained model 123 which can determine that a sample is an anomaly 124 and, if the sample is determined to be an anomaly 124, the trained logistic regression model does not assign a category from the set of predetermined categories.

Returning to block 209, if the sampling computing device 130 detects another one of the predetermined categories known to the trained model 123 (e.g., the trained logistic regression model) other than the "no seed flow" category, the method 200 proceeds to block 210. Determining the category assignment for the next vibration input sample 121 could include one or more of saving the determined category assignment in a data storage unit 133 of the sampling computing device 130 and communicating the determined category assignment for the input sample 121 to the management computing system 150 via the network 170.

At block 210, the method 200 involves incrementing, by the sampling computing device, a counter associated with a respective identified predetermined category identified for the input sample 121 (or input sample representation 122) in block 208. In certain examples, the counter tracks a number of consecutive input samples 121 detected by a transducer 113 device (assigned to a particular flow tube 112 or set of flow tubes 112) assigned by the model 123 to a particular category. In another example, the counter tracks a time duration of a number of consecutive input samples 121 detected by the transducer 133 device and assigned by the model 123 to the particular category.

At block 211, the method 200 involves determining, by the sampling computing device, whether a threshold for the counter has been exceeded or has not been exceeded. For example, a threshold may comprise a number of input samples 121 corresponding to 10 seconds worth of input samples 121 corresponding to the category. In some instances, when configuring the alert threshold, as the alert threshold is increased, a speed at which the sampling computing device 130 reports an alarm will be decreased as the sampling computing device 130 detects a series of classified input samples 121 associated with the respective alarm counter. In some instances, when configuring the alert threshold, as the alert threshold is decreased, a speed at which the sampling computing device 130 reports an alarm will be increased as the sampling computing device 130 detects a series of input samples 121 associated with the particular category of the set of predefined categories using the trained logistic regression model. Accordingly, decreasing the alert threshold results in an alarm that is more sensitive while increasing the alert threshold results in an alarm that is less sensitive. Further, determining when and how the alarm counter is reset can also affect a sensitivity of the alarm.

If the sampling computing device 130 determines that the alert threshold has not been exceeded responsive to incrementing the counter in block 210, the method 200 returns to block 207 and the sampling computing device 130 extracts another input sample 121 from the next sensor 221 channel via the loop buffer of block 207.5. For example, an alert threshold is ten seconds worth of input samples 121 assigned by the classification model 123 to the category associated with the counter. For example, the sampling computing device 130 increments the alarm counter from eight to nine and determines that the current alarm counter value (nine) is less than the alert threshold (ten seconds worth of input samples 121).

Returning to block 211, if the sampling computing device 130 determines that the blockage alert threshold has been exceeded responsive to incrementing the counter in block 210, the method 200 proceeds to block 213. For example, the sampling computing device 130 determines, using the counter threshold, that a particular operating condition associated with a predetermined category has exceeded the threshold.

At block 213, the method 200 involves sending, by the sampling computing device 130, an alert corresponding to the category. Reporting the alert could include one or more of generating an alarm report 141, saving the alarm report 141 in a data storage unit 133 of the sampling computing device 130 and communicating the alarm report 141 to the management computing system 150 via the network 170. The alarm report 141 could include the current input sample 121 which triggered the alert as well as one or more previous input samples 121 for which the sampling computing device 130 detected the same category and incremented the alarm counter. In certain examples, an operator of the sampling computing device 130 or an operator of the management computing system 150 could review the input samples 121 associated with the reported alarm report 141 and take one or more actions with respect to the equipment 111 or the operating site environment 110 to address the alarm report 141. The one or more actions could be clearing the flow tube 112 associated with the transducer 113 of a blockage, directing the equipment 111 to back up and respread seed over a portion of a field that was missed during the blockage, or other appropriate action.

In certain examples, responsive to reporting an alarm (e.g., generating an alarm report 141), the sampling computing device 130 performs one or more equipment management 143 operations, as depicted in FIG. 1. For example, performing equipment management 143 operations could include communicating with the equipment 111 or one or more devices associated with the equipment 111 to transmit instructions to disable the equipment 111 (e.g. disable an engine of the equipment 111), disable one or more operations of the equipment 111, perform one or more operations of the equipment 111 (e.g. direct equipment 111 to perform an operation to clear a blockage in the flow tube 112, stop, turn, go in reverse, etc.). For example, the equipment 111 is a planter device that is distributing seed through a flow tube 112 and then the flow tube 112 develops a blockage, producing an anomalous physical vibration when compared to previous physical vibrations detected while flow tube 112 was not blocked, which results in the sampling computing device 130 reporting an alarm for the flow tube 112 after detecting a predetermined number of input samples 121 classified in a "blockage" category according to the trained classification model 123. In this example, performing equipment management 143 operations could include directing the planter device to perform an operation to unblock the flow tube 112, directing the planter device to apply the brakes, disabling the planter device until an operator manually unblocks the flow tube 112, or directing the planter device to turn or go in reverse.

In certain embodiments, the sampling computing device 130 logs geolocation data (e.g., location coordinates) and/or logs a timestamp and transmits the geolocation data and/or timestamp along with each determined cluster assignment and/or determined anomaly 124 (or non-anomalous 125 sample) designation for each next vibration sample to the management computing system 150. In these embodiments, the management computing system 150 may map or otherwise correlate the location and/or time information with cluster assignment information (or anomalous/non-anomalous designation) of the next vibration sample. In certain embodiments, the management computing system 150 may provide the correlated location, time, and/or cluster/anomaly information for display in a user interface, for example, on a user interface of the sampling computing device 130.

From block 213, the method 200 returns to block 207 and the sampling computing device 130 extracts another input sample 121. The method 200 further involves, in a circular/ round robin manner, cycling through each of the sensor 221 channels and performing blocks 208-212, as applicable to a successive extracted input sample 121 from each successive sensor 221 channel. Accordingly, each of the following blocks 208-212 is described for a single audio sample 121 originating from a single sensor 221 channel (and associated transducer 113 device which monitors an assigned flow tube 112 or an assigned group of flow tubes 112 of the equipment 111), but these blocks, as applicable, are performed for input samples 121 (or input sample representations 122) of each of extracted sensor 221 channel for the most recent predetermined duration in a successive manner as the sampling computing device 130 cycles through the loop buffer.

FIG. 3 depicts an illustration of example audio file 300 representing an input sample 121, according to certain embodiments described in the present disclosure. This illustration of the example audio file 300 includes a one-dimensional array represented by a horizontal axis representing a time dimension and a vertical axis representing an intensity of a signal at a moment. The signal is discretely measured at each sampling interval.

FIG. 4 depicts an illustration of an example audio spectrogram, according to certain embodiments described in the present disclosure. In certain embodiments, signals that are captured by the sampling computing system via the transducer computing device 113 are converted from the one-dimensional array format depicted in FIG. 3 to the audio spectrogram 400 format as depicted in FIG. 4. The spectrogram 400 is a two-dimensional array that represents an intensity of various frequencies present in the audio signal across a time range. The spectrogram 400 illustrated in FIG. 4 is a spectrogram for a one-second vibration input sample 121. Once the spectrogram 400 is rendered from a sample waveform (e.g., the audio file, the one-dimensional array), the spectrogram could be converted back into a one-dimensional array, which can be used as input for dimensional reduction and model 123 training. In certain embodiments described herein, the spectrogram 400 or the one-dimensional array determined from the spectrogram 400 can be used as an input sample representation 122 to which the model 123 is applied. In other embodiments, the model 123 is applied to the raw input sample 121 an input sample representation 122 is not generated.

FIG. 5 depicts an illustration of example principal components analysis ("PCA") clustering 500 of vibration input samples for use in certain embodiments described herein. The PCA clustering is conducted by performing PCA of input samples 121 to determine dimensional data and to cluster the input samples 121 using the dimensional data, according to certain embodiments described in the present disclosure. In some instances, the PCA clustering is conducted by performing PCA of input sample representations 122 (e.g., spectrogram 400 as illustrated in FIG. 4) to determine dimensional data to cluster the input sample representations 122 using the dimensional data, according to certain embodiments described in the present disclosure. The PCA clustering 500 illustrated in FIG. 5 represents a clustering of sample spectrograms. Each dot on the graph in FIG. 5 represents a sample. In some instances, the samples take the form of a flatted 64×65 matrix, and therefore, have a dimensionality of 4260. In some instances, this highly dimensional data is reduced to a much smaller dimensional space, as shown in the PCA clustering 500, which shows a three-dimensional space. However, the number of dimensions in the reduced dimensional data is configurable and a larger number of dimensions than three could be used. In some instances, increasing the number of dimensions for the reduced dimensional data increases an accuracy of the clustering but also increases an amount of processing required to apply the clustering algorithm. In some instances, decreasing the number of dimensions for the reduced dimensional data decreases the accuracy of the clustering but also decreases the amount of processing required to apply the clustering algorithm.

FIG. 6 depicts an illustration of cluster assignment probabilities 600 predicted for an input sample 121, according to certain embodiments described in the present disclosure. In an example, the sampling computing device 130 inputs an input sample 121 (or an input sample representation 122 determined from the input sample 121, for example, a spectrogram or 1-dimensional array derived from a spectrogram) to the model 123 (trained logistic regression model). In this example, the model 123 is trained to assign the input sample 121 or input sample representation 122 to a cluster of a set of clusters. In the example depicted in FIG. 6, the trained cluster assignment module is trained to assign a next vibration input sample 121 to one of six labeled clusters representing categories. For example, cluster 0 represents a flow of corn seed, cluster 1 represents a flow of barley seed, cluster 2 represents a flow of chickpeas seed, cluster 3 represents a flow of wheat seed, cluster 4 represents a flow of soy seed, and cluster 5 represents a flow of beans. In this example, the flow means an unblocked flow of the corresponding seed type through the flow tube 112 (or set of flow tubes 112) assigned to the sensor 821/transducer 113 from which the classified input sample 121 originates. The categories depicted in FIG. 6 are example and other categories may be used, for example, where each cluster corresponds to a combination of operating conditions of the equipment 111 and/or flow tube 112. For example, a cluster/category could represent an unobstructed flow of corn seed through a flow tube 112 in an equipment that is moving and another cluster/category could represent a partially obstructed flow of soy seed in stopped equipment 111, while another cluster/category could represent an obstructed flow of seed in a moving equipment 111. In this example, the model 123 determines a cluster affinity for each of the clusters/categories, as depicted in FIG. 6. In this example, as shown in FIG. 6, cluster 4 has the highest affinity value, followed by cluster 5 with the second highest affinity value, followed by cluster 2 with the third highest affinity value, followed by cluster 0 with the fourth highest affinity value, followed by clusters 1 and 3, which each have the fifth highest affinity value. In this example, the sampling computing device 130 assigns the next vibration input sample 121 to cluster 4, because cluster 4 has the greatest affinity value of the six clusters as determined by the trained cluster assignment model.

FIG. 7 provides an example illustration of input samples 121 (in some instances, represented by input sample representations 122) assigned to a set of predetermined categories known to a trained model 123 (e.g., a trained logistic regression model). In this example, clusters associated with predefined categories for which the model 123 is trained are depicted, for example a corn 701 cluster corresponding to a flow of corn through the flow tube 112, a soy 702 cluster corresponding to a flow of soy through the flow tube 112, a barley 703 cluster associated with a flow of barley seed through the flow tube 112, a wheat 704 cluster associated with a flow to wheat through the flow tube 112, and a no flow 705 cluster associated with a blockage of the flow tube 112. FIG. 7 illustrates a location within a three-dimensional space (determined via PCA) of each of the classified input samples 121 (or input sample representations 122), which are represented by the other dots in the three-dimensional space of FIG. 7.

Example of a Computing System for Implementing Certain Embodiments

Figure 8:
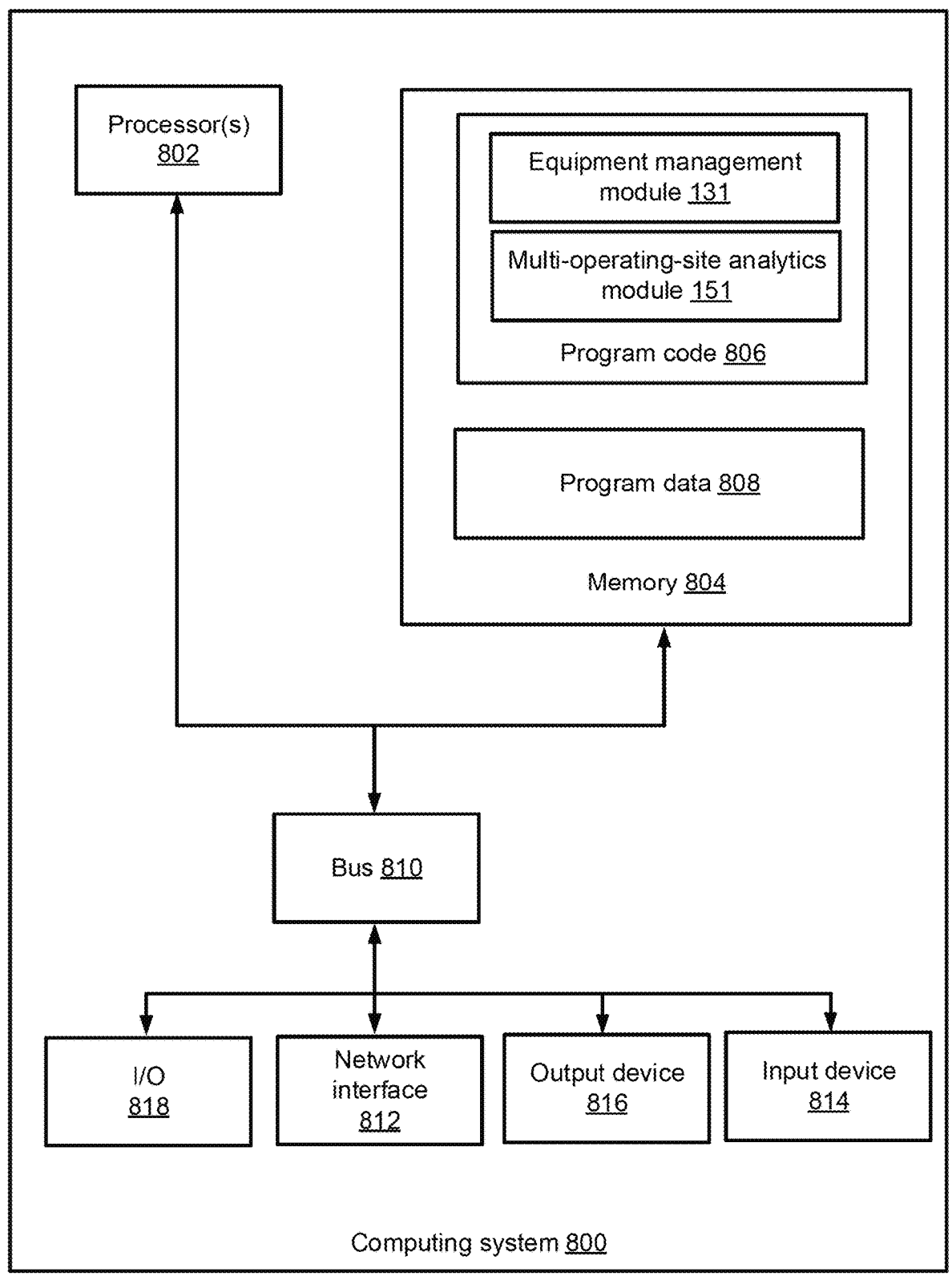
FIG. 8 depicts an example of a computing system that performs certain operations described herein, according to certain embodiments described in the present disclosure.

Any suitable computing system or group of computing systems can be used for performing the operations described herein. For example, FIG. 8 depicts an example of a computing system 800. The computing system 800 includes the management computing system 150.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions.

The computing system 800 executes program code 806 that configures the processor 802 to perform one or more of the operations described herein. The program code 806 includes, for example, the equipment management module 131 and the multi-operating-site analytics module 151, or other suitable applications that perform one or more operations described herein. The program code 806 may be resident in the memory device 804 or any suitable computer-readable medium and may be executed by the processor 802 or any other suitable processor. The program code could include processor-specific instructions generated by a compiler or an interpreter from code written in any suitable computer-programming language, including, for example, C, C++, C #, Visual Basic, Java, Python, Perl, JavaScript, and ActionScript.

In some embodiments, program code 806 for implementing both the equipment management module 131 and the multi-operating-site analytics module 151 are stored in the memory device 804, as depicted in FIG. 8. In additional or alternative embodiments, program code 806 for implementing one or more of the equipment management module 131 and the multi-operating-site analytics module 151 are stored in different memory devices of different computing systems. In additional or alternative embodiments, the program code 806 described above is stored in one or more other memory devices accessible via a data network.

The computing system 800 can access program data 807, which includes one or more of the datasets described herein (e.g., training set data. cluster assignments, anomaly or non-anomaly designations), in any suitable manner. In some embodiments, some or all of one or more of these data sets, models, and functions are stored as the program data 807 in the memory device 804, as in the example depicted in FIG. 8. In additional or alternative embodiments, one or more of these data sets, models, and functions are stored in the same memory device (e.g., one of the memory devices 804). For example, a common computing system, such as the management computing system 150 depicted in FIG. 1, can hardware, software, or both that implements the equipment management module 131 and the multi-operating-site analytics module 151. In additional or alternative embodiments, one or more of the programs, data sets, models, and functions described herein are stored in one or more other memory devices accessible via a data network.

The computing system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and the like. The computing system 800 is able to communicate with one or more other computing devices (e.g., sampling computing device 130) via a data network using the network interface device 812.

The computing system 800 may also include a number of external or internal devices, such as input or output devices. For example, the computing system 800 is shown with one or more input/output ("I/O") interfaces 818. An I/O interface 818 can receive input from input devices or provide output to output devices. One or more buses 810 are also included in the computing system 800. The bus 810 communicatively couples one or more components of a respective one of the computing system 800.

In some embodiments, the computing system 800 also includes the input device 814 and the presentation device 816 depicted in FIG. 8. An input device 814 can include any device or group of devices suitable for receiving visual, auditory, or other suitable input that controls or affects the operations of the processor 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computing device that executes the program code 806, other implementations are possible. For instance, in some embodiments, one or more of the input device 814 and the presentation device 816 can include a remote client-computing device that communicates with the computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
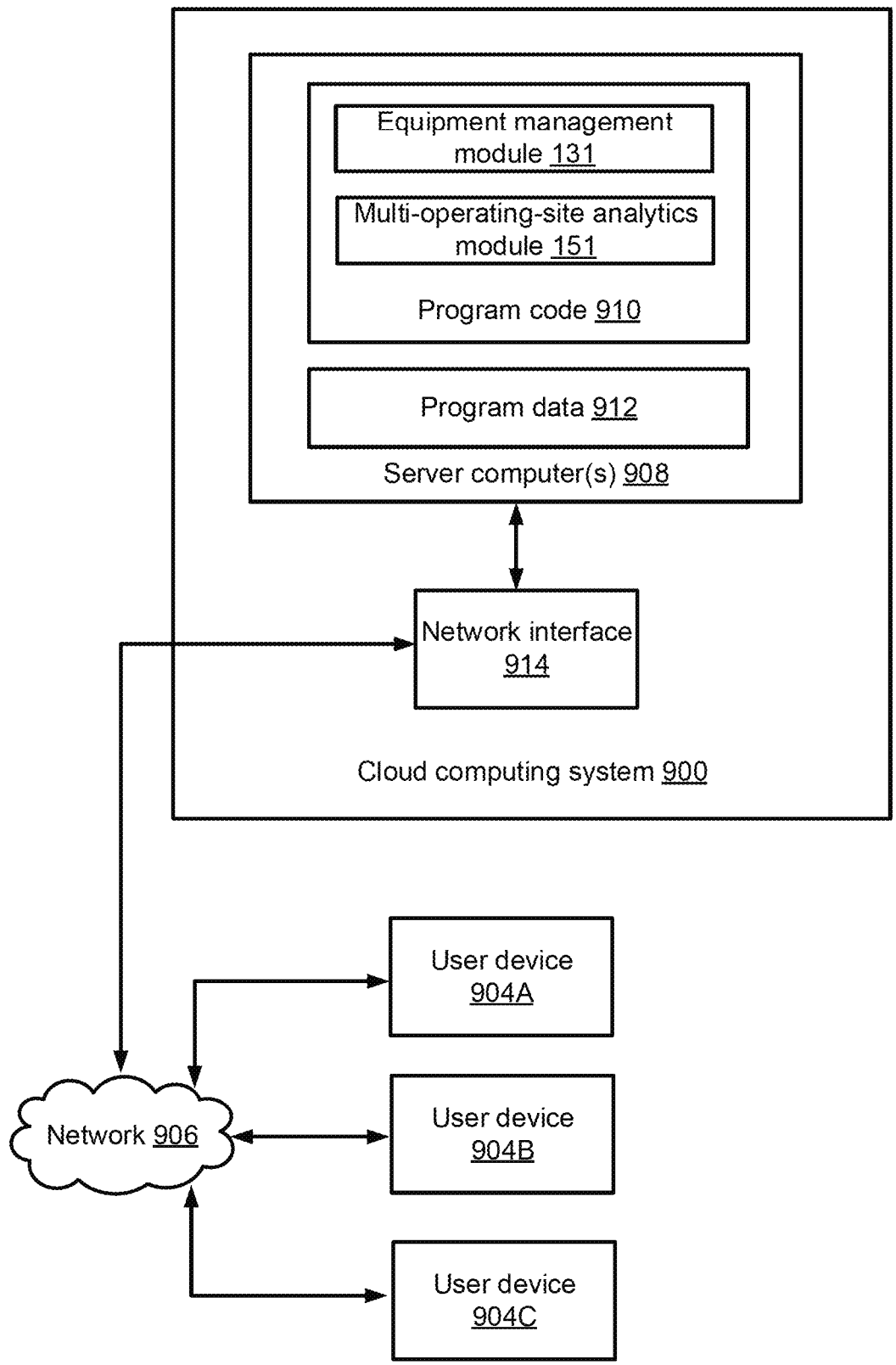
FIG. 9 depicts an example of a cloud computing system that performs certain operations described herein, according to certain embodiments described in the present disclosure.

In some embodiments, the functionality provided by computer system 800 may be offered as cloud services by a cloud service provider. For example, FIG. 9 depicts an example of a cloud computer system 900 offering an equipment management module 131 and a multi-operating-site analytics module 151 that can be used by a number of user subscribers using user devices 904A, 904B, and 904C across a data network 906. In the example, the equipment management module 131 and the multi-operating-site analytics module 151 may be offered under a Software as a Service (SaaS) model. One or more users may subscribe to the next event prediction and dynamic clustering service, and the cloud computer system 900 performs the equipment management module 131 and the multi-operating-site analytics module 151 to subscribers. For example, the cloud computer system 900 performs services comprising one or more of steps or functions illustrated in FIG. 1 and FIG. 2 and described herein. The cloud computer system 900 may include one or more remote server computers 908.

The remote server computers 908 include any suitable non-transitory computer-readable medium for storing program code 910 (e.g., the equipment management module 131 and the multi-operating-site analytics module 151) and program data 912, or both, which is used by the cloud computer system 900 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 908 can include volatile memory, non-volatile memory, or a combination thereof.

One or more of the server computers 908 execute the program code 910 that configures one or more processors of the server computers 908 to perform one or more of the operations that provide one or more methods described herein (e.g., the methods of FIG. 1 and FIG. 2 described herein). As depicted in the embodiment in FIG. 9, the one or more servers may implement the equipment management module 131 and the multi-operating-site analytics module 151. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory device of the server computers 908 or any suitable computer-readable medium and may be executed by the processors of the server computers 908 or any other suitable processor.

In some embodiments, the program data 912 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 906.

The cloud computer system 900 also includes a network interface device 914 that enables communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The next event prediction and dynamic clustering service is able to communicate with the user devices 904A, 904B, and 904C via the data network 906 using the network interface device 914.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied— for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable storage medium comprising computer-executable instructions that when executed by a processor cause the processor to perform operations comprising:
   receiving, from each a plurality of transducer computing devices, respective vibration input samples;
   generating a loop buffer corresponding to a most recent threshold number of vibration input samples received from each of the plurality of transducer computing devices including a first transducer computing device located within a predefined proximity to a first flow tube of an equipment and a second transducer device located within the predefined proximity to a second flow tube of the equipment;
   accessing, from the loop buffer, a most recent first vibration input sample logged by the first transducer computing device;
   using a trained model, assign the first vibration input sample to a first category of a set of categories for which the trained model is trained, each category of the set of categories specifying an operating condition of flow tubes of the equipment;
   accessing, from the loop buffer subsequent to accessing the first vibration input sample, a most recent second vibration input sample logged by a second transducer computing device;
   using the trained model, assign the second vibration input sample to a second category of the set of categories;
   responsive to assigning the first category to the first vibration input sample, incrementing an alarm counter associated with the first category; and
   responsive to determining that the alarm counter meets or exceeds an alert threshold, reporting, to a computing system, an alarm status for the first flow tube corresponding to the first category.

2. The non-transitory computer-readable storage medium of claim 1, wherein the equipment comprises an autonomous planter machine and wherein the operations further comprise transmitting, responsive to determining that the alarm counter meets or exceeds an alert threshold, instructions to the autonomous planter machine to perform one or more operations or to stop performing the one or more operations associated with the assigned category.

3. The non-transitory computer-readable storage medium of claim 2, wherein the category comprises an operating condition comprising a blockage of the first flow tube, and wherein the one or more operations include removing the blockage in the first flow tube.

4. The non-transitory computer-readable storage medium of claim 1, wherein the trained model comprises a cluster assignment model comprising a logistic regression model, a tree-based model, or a random forest model.

5. The non-transitory computer-readable storage medium of claim 1, wherein the trained model comprises an anomaly detection model, wherein the set of categories comprise an anomalous category or a non-anomalous category.

6. The non-transitory computer-readable storage medium of claim 1, wherein the first transducer computing device comprises a transducer that detects physical vibrations in an environment of the first flow tube and converts the detected physical vibrations to electrical signals, wherein the transducer generates the first vibration input sample based on the electrical signals.

7. A computer-implemented method, comprising, using a sampling computing device to perform operations comprising:
   receiving, from each a plurality of transducer computing devices, respective vibration input samples;
   generating a loop buffer corresponding to a most recent threshold number of vibration input samples received from each of the plurality of transducer computing devices including a first transducer computing device located within a predefined proximity to a first flow tube of an equipment and a second transducer device located within the predefined proximity to a second flow tube of the equipment;
   accessing, from the loop buffer, a most recent first vibration input sample logged by the first transducer computing device;
   using a trained model, assign the first vibration input sample to a first category of a set of categories for which the trained model is trained, each category of the set of categories specifying an operating condition of flow tubes of the equipment;

accessing, from the loop buffer subsequent to accessing the first vibration input sample, a most recent second vibration input sample logged by a second transducer computing device;

using the trained model, assign the second vibration input sample to a second category of the set of categories;

responsive to assigning the first category to the first vibration input sample, incrementing an alarm counter associated with the first category; and responsive to determining that the alarm counter meets or exceeds an alert threshold, reporting, to a computing system, an alarm status for the first flow tube corresponding to the first category.

8. The computer-implemented method of claim 7, wherein the equipment comprises an autonomous planter machine and wherein the operations further comprise transmitting, responsive to determining that the alarm counter meets or exceeds an alert threshold, instructions to the autonomous planter machine to perform one or more operations or to stop performing the one or more operations associated with the assigned category.

9. The computer-implemented method of claim 8, wherein the category comprises an operating condition comprising a blockage of the first flow tube, and wherein the one or more operations include removing the blockage in the first flow tube.

10. The computer-implemented method of claim 7, wherein the trained model comprises a cluster assignment model comprising a logistic regression model, a tree-based model, or a random forest model.

11. The computer-implemented method of claim 7, wherein the first transducer computing device comprises a transducer that detects physical vibrations in an environment of the first flow tube and converts the detected physical vibrations to electrical signals, wherein the transducer generates the first vibration input sample based on the electrical signals.

12. The computer-implemented method of claim 7, wherein the trained model comprises an anomaly detection model, wherein the set of categories comprise an anomalous category or a non-anomalous category.

13. A system, comprising:
one or more processors; and
a non-transitory computer-readable storage medium comprising computer-executable instructions that, when executed by the processor, cause the system to perform operations comprising:
receiving, from each a plurality of transducer computing devices, respective vibration input samples;
generating a loop buffer corresponding to a most recent threshold number of vibration input samples received from each of the plurality of transducer computing devices including a first transducer computing device located within a predefined proximity to a first flow tube of an equipment and a second transducer device located within the predefined proximity to a second flow tube of the equipment;
accessing, from the loop buffer, a most recent first vibration input sample logged by the first transducer computing device;
using a trained model, assign the first vibration input sample to a first category of a set of categories for which the trained model is trained, each category of the set of categories specifying an operating condition of flow tubes of the equipment;
accessing, from the loop buffer subsequent to accessing the first vibration input sample, a most recent second vibration input sample logged by a second transducer computing device;
using the trained model, assign the second vibration input sample to a second category of the set of categories;
responsive to assigning the first category to the first vibration input sample, incrementing an alarm counter associated with the first category; and
responsive to determining that the alarm counter meets or exceeds an alert threshold, reporting, to a computing system, an alarm status for the first flow tube corresponding to the first category.

14. The system of claim 13, wherein the equipment comprises an autonomous planter machine and wherein the operations further comprise transmitting, responsive to determining that the alarm counter meets or exceeds an alert threshold, instructions to the autonomous planter machine to perform one or more operations or to stop performing the one or more operations associated with the assigned category.

15. The system of claim 14, wherein the category comprises an operating condition comprising a blockage of the first flow tube, and wherein the one or more operations include removing the blockage in the first flow tube.

16. The system of claim 13, wherein the trained model comprises a cluster assignment model comprising a logistic regression model, a tree-based model, or a random forest model.

17. The system of claim 13, wherein the first transducer computing device comprises a transducer that detects physical vibrations in an environment of the first flow tube and converts the detected physical vibrations to electrical signals, wherein the transducer generates the first vibration input sample based on the electrical signals.

* * * * *